R. ROCKWELL & Z. B. CUSTER.
SCRUBBING BRUSH.

No. 109,946. Patented Dec. 6, 1870.

Witnesses:

Inventor:
Ralph Rockwell
Zora B. Custer
Per
Attorneys.

United States Patent Office.

RALPH ROCKWELL AND ZORA B. CUSTER, OF PETROLEUM CENTRE, PENNSYLVANIA.

Letters Patent No. 109,946, dated December 6, 1870.

IMPROVEMENT IN SCRUBBING-BRUSHES.

The Schedule referred to in these Letters Patent and making part of the same.

*To all whom it may concern:*

Be it known that we, RALPH ROCKWELL and ZORA B. CUSTER, of Petroleum Centre, in the county of Venango and State of Pennsylvania, have invented a new and improved Scrubbing-Brush; and we do hereby declare the following to be a full, clear, and exact description of the same, reference being had to the accompanying drawing making a part of this specification, in which—

Figure 1:
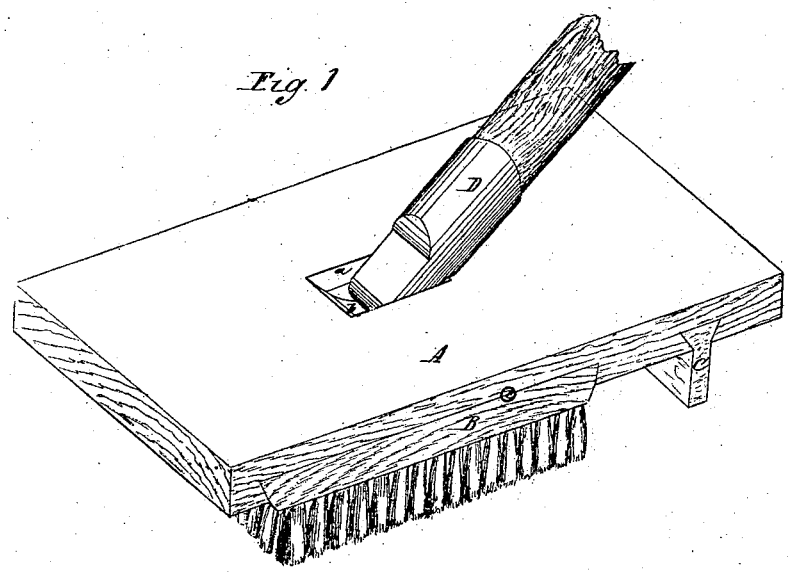
Figure 2:
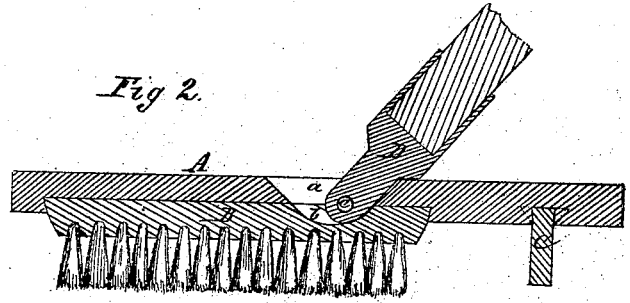

Figure 1 is a view in perspective, and
Figure 2 is a sectional elevation.

This invention relates to the manner of securing the wooden stock of a scrubbing-brush, or that portion in which the bristles are set, to the base-board, with which the handle is connected, and which bears the rubber strip that operates as a drier.

The invention consists in a wooden stock having beveled edges, in combination with a base-board having a recess with beveled sides, into which said stock fits, and from which it is prevented from dropping out by the dovetail joint, and also in combination with a socket for the brush-handle, which is pivoted in the said base-board, and extends into a recess formed in the upper side of the stock, and thus prevents the latter from moving laterally in the base-board.

Referring to the drawing—

A is the base-board;
B, the brush-stock fitted with a dovetail joint in the base-board;
C is the rubber strip secured in a groove, having either vertical or inclined sides and running transversely of the base-board;

D is the socket for the brush-handle;
a, the recess in the base-board; and
b, the recess in the brush-stock which said socket enters, thereby preventing lateral displacement of the stock.

c is the pivot of the socket.

The recesses a and b are of such width as to admit of inclining the socket either to the right, as shown in the drawing, or to the left, so as to enable the operator to run either the brush or rubber strip in advance.

The function of the brush is, with the aid of water, to scour floors, and the function of the strip is to dry them after scouring.

Having thus described my invention,

What I claim as new, and desire to secure by Letters Patent, is—

The brush-stock B held in dovetailed grooves of the board A, and prevented from lateral displacement by the socket D entering the recess b, as shown and described.

To the above specification of our invention we have signed our hands this 8th day of October, 1870.

RALPH ROCKWELL.
ZORA B. CUSTER.

Witnesses to the signature of RALPH ROCKWELL:
SOLON C. KEMON,
D. OURAND.

Witnesses to the signature of Z. B. CUSTER:
SAM. REYNOLDS,
JAMES H. SMITH.